United States Patent Office 2,702,487
Patented Feb. 22, 1955

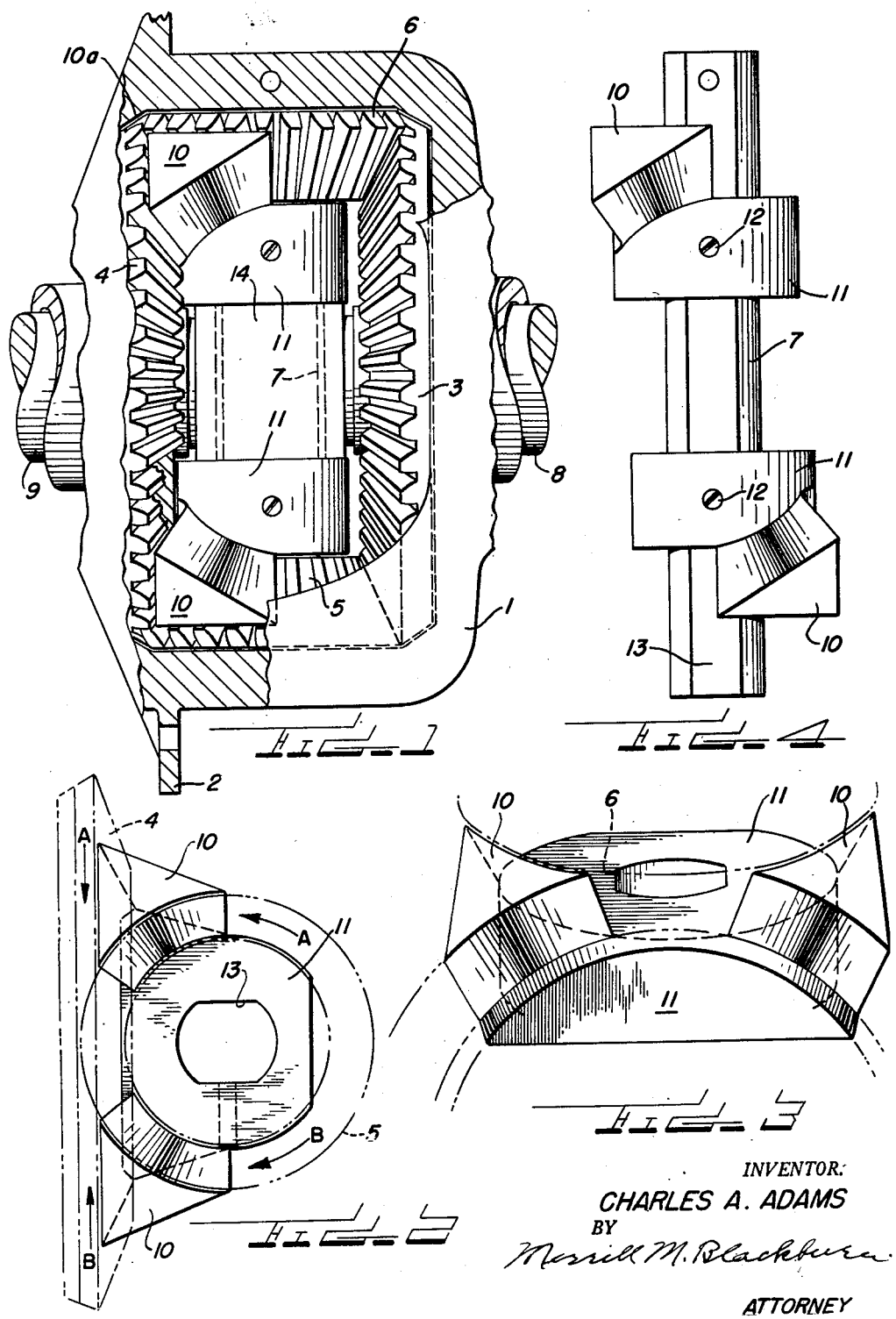

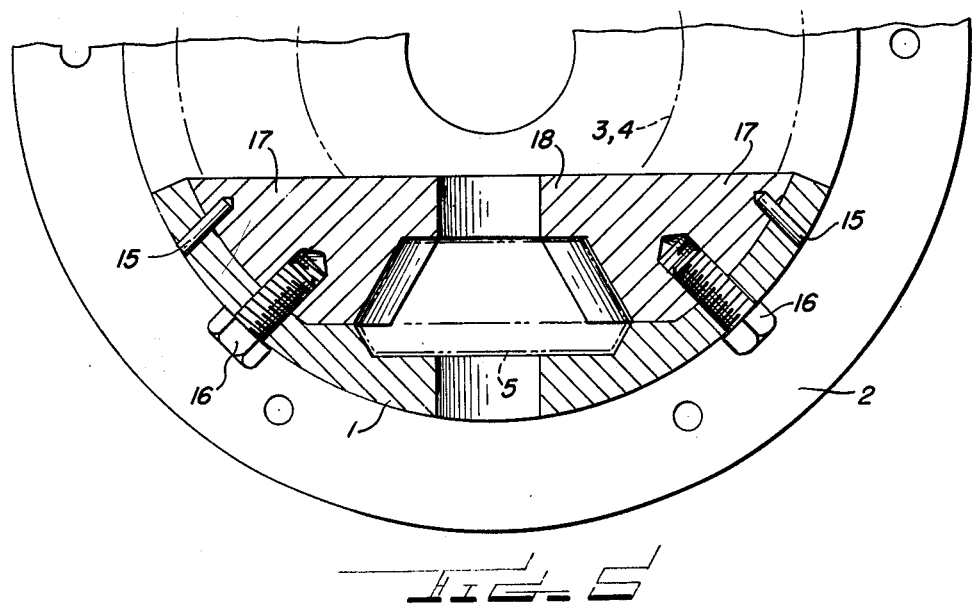

2,702,487

HYDRAULIC DIFFERENTIAL CONTROL

Charles A. Adams, Davenport, Iowa

Application January 8, 1951, Serial No. 204,890

7 Claims. (Cl. 74—711)

Among the objects of this invention are to provide a mechanism which will enable a driver of a car to get out of a slippery place when only one wheel will secure traction; to provide a differential mechanism in which, when the driving element drives one of two driven elements, it will drive the other, also; to provide a differential mechanism in which only partial differential action is permitted between the driven elements of the differential; and such further objects, advantages, and capabilities as will hereafter appear and as are inherent in the structure herein shown and described. My invention further resides in the combination, construction, and arrangement of parts illustrated in the accompanying drawings and, while I have shown therein what is now regarded as the preferred embodiment of this invention, I desire the same to be understood as illustrative only and not to be interpreted in a limiting sense.

In the drawings annexed hereto and forming a part hereof,

Fig. 1 shows a partly broken away elevation of a differential according to my invention;

Fig. 2 shows a face view of a baffle plate and two baffle blocks which comprise a unitary structure;

Fig. 3 is a perspective view of one of the baffles with two baffle blocks on the baffle plate;

Fig. 4 is an elevation of a pinion shaft with baffle blocks arranged in different positions which would be operative in either position;

Fig. 5 shows a modified form of the baffle.

Reference will now be made in greater detail to the annexed drawings for a more complete description of this invention. The housing for the differential gearing is shown at 1 and this is provided with a flange 2 for the mounting of the customary ring gear whereby the power is furnished to the differential. As is well known to those skilled in the art, the differential housing is rotated by the ring gear, and the two gears in the housing are driven in the same direction and at the same speed, normally. However, when the vehicle turns around a corner or one driven wheel slips, one of the gears travels a little faster than the other. This is particularly true when one wheel is holding on pavement and the other wheel is slipping on wet or snowy or icy pavement. It is to avoid this difference in travel that I have provided against by this invention.

Within the housing or case 1 are provided two bevel gears 3 and 4 and two bevel pinions 5 and 6. These gears and pinions intermesh and, when there is no slipping, the bevel gearing turns as a unit. The pinions 5 and 6 are mounted on a shaft 7 which is secured to the housing, and the pinions turn about the shaft 7, being free to turn thereon, as compelled by the gears 3 and 4 which are mounted on the shafts 8 and 9. Thus far there has been disclosed a well known structure.

The mechanism for preventing free rotation of the gears 3 and 4 will now be considered. If it is assumed that the wheel connected to the shaft 8 is on slippery pavement, it can slip, and that allows the gear 3 to spin unless there is something which prevents it from doing so. This I accomplish by providing baffle blocks 10 connected by baffle plates 11. The baffles comprise the blocks 10 and plates 11. The case 1 is so constructed as to freely expose the gears and pinions to the oil carried within the case, and the blocks are fitted in close relation to the face of the gear teeth, while the baffle plate 11 is in close relation to the inner ends of the gear teeth. The case 1 is formed in close relation to the outer ends of the gear teeth, close to the point where the gears and pinions engage. When the teeth of the gears and pinions mesh, there is a tendency for them to force the grease or oil back, but the baffles and housing fit close enough to substantially prevent this to a major extent and, consequently, they compel the gears to turn substantially as a unit with the case.

The baffle plates 11 are pinned or keyed to the shaft 7 or are fastened in place by screws 12 in order to keep them from shifting in the housing and consequently interfering with the gears and pinions, or they may fit a shaft with flattened sides, as shown at 13. As shown in Figs. 2 and 3, the plate 11 connects the two blocks 10 and makes them unitary. There may be one or two units 10 and 11, and they may be operative to compel the wheels to operate simultaneously, either in going forwardly or rearwardly. The shaft 7 passes through the housing 1 between the gears 3 and 4 and holds the plates 11 fixed with relation to the shaft. A spacer block 14 surrounds the shaft 7 and serves to limit endwise movement of the plates 11. While I have shown and described the use of baffles fastened to the shaft 7, it will be understood that the baffles may be attached to the housing, as shown in Fig. 5.

In the construction of Fig. 5, there are blocks 17 corresponding to blocks 10, but these are held in place by being connected to the housing 1 by dowels 15 and bolts 16 passing through the casing or housing 1. Plate 18 constitutes a part of the baffle, as does 11, and serves the same purpose. The bolts 16 are screwed into the blocks 17 and hold them to the inside of the housing in close proximity thereto.

In Fig. 2, the gear 4 and pinion 5 are represented by broken lines which indicate the position of these elements. The pinion 5 meshes with the gear 4, and the arrows A show the gears turning in one direction while arrows B show the gears turning in the opposite direction. When the gears turn in the direction indicated by the arrow A, grease or oil is carried by the gears under the blocks 10 and is prevented from squeezing out. The meshing of the teeth tends to force the grease or oil out from between the teeth, but it is held in place by the baffles. The housing and the baffles fit the gears so closely that there is not room for the grease or oil to be forced out except in a very small amount which is sufficient to allow one wheel to travel somewhat faster, thereby retaining part of the differential action. The result is that the shafts 8 and 9 turn simultaneously in the same direction so that one can get his car off of a slippery place.

It is of course understood that the specific description of structure set forth above may be departed from without departing from the spirit of this invention as disclosed in this specification and as defined by the appended claims.

Having now described my invention, I claim:

1. In a conventional substantially open differential gear case which permits free access of a uniform supply of oil to the differential gears and pinions, a pinion shaft on which said pinions are mounted, the differential case being formed to a close running fit to the outer ends of the gear and pinion teeth at approximately the point of engagement thereof, baffles in said differential case supported non-rotatably on the differential pinion shaft, said baffles being formed to fit closely a portion of the face and inner ends of the teeth of the gears and pinions, said baffles and the differential case being formed in such relation to the differential gears and pinions as to cause hydraulic resistance by the oil to rotation of the differential gears and pinions in either direction.

2. The improvement in a conventional open differential gear case which comprises a gear case open on two sides to allow free access of a uniform supply of oil to the differential gears and pinions, a pinion shaft on which said pinions are mounted, said case being formed to a close running fit to the outer ends of the differential gear and pinion teeth, a pair of baffles formed to a close running fit to the inner ends and faces of the gear and pinion teeth, in close proximity to the point of engagement of the differential gear and pinion teeth, said baffles being mounted on the normal pinion supporting shaft, said differential case and baffles being formed to cause hydraulic resistance, by the oil passing thereunder, to rotation of the gears and pinions in either direction.

3. In a conventional open differential gear case, the gear case being open on two sides to allow free access of a uniform supply of oil to the differential gears and pinions, the improvement which comprises said case being formed to a close running fit to the outer ends of the differential gear and pinion teeth, a shaft connecting the pinions in running relation to the differential gears, and a pair of baffles formed to a close running fit to the inner ends and faces of the gear and pinion teeth, in close proximity to the point of engagement of the differential gear and pinion teeth, said baffles being mounted on said shaft and being secured to the differential case, said differential case and baffles being formed to cause hydraulic resistance to rotation of the gears and pinions in either direction, when oil is carried under the baffles by the gear and pinion teeth.

4. The combination of a differential case open to the supply of oil normally carried in the rear axle housing, a part of which forms oil baffles for the outer ends of the differential gear and pinion teeth, a differential pinion shaft, differential gearing, and oil baffles covering the face and inner ends of a part at least of the differential gear and pinion teeth to cause hydraulic interference with the rotation of the differential gears and pinions when oil passes under said baffles, said baffles being supported on the differential pinion shaft.

5. In a differential having an open differential housing with openings on opposite sides of the housing which permit an ample and uniform supply of oil to be delivered from the axle housing to the differential gears and pinions at all times, said differential housing being formed to a close running fit to the outer ends of the differential gear and pinion teeth, oil baffles formed to a close running fit to the inner ends and faces of the differential gear and pinion teeth, particularly at a point close to the engagement of said gear and pinion teeth, said oil baffles being supported on the usual non-rotatable fixed pinion-supporting shaft, and means provided to secure said oil baffles in a non-rotatable adjusted position on said pinion shaft, thus enabling the baffles to exert hydraulic pressure by the oil carried thereunder by the teeth.

6. In a conventional open differential gear case, rotatable differential gears in said case driving an axle, said case having a stationary pinion supporting shaft, pinions rotating on said shaft and meshing with the axle-driving gears, the case being open on two sides, normally entirely exposing the gears and pinions to a full bath of oil normally carried in the rear axle housing of an automobile, the improvement comprising a differential case formed to a close running fit to the outer ends of the differential gear and pinion teeth, and a pair of oil baffles supported on and secured to said stationary pinion supporting shaft, the baffles being formed to a close running fit to the inner ends and faces of the differential gear and pinion teeth at a point close to the engagement thereof, whereby the major face portion of the gear and pinion teeth is exposed to a full supply of oil, which oil is carried under the baffles, thereby creating hydraulic resistance to rotation of the differential gears and pinions.

7. In a conventional open differential gear case, the gear case being open on two sides, the openings thereby exposing the differential gears and pinions to a supply of oil normally carried in the rear axle housing of an automobile, the gear case being formed to a close fit to the outer ends of the differential gear and pinion teeth, a fixed shaft in said gear case supporting said pinions, said pinions supported rotatably in meshing relation with the differential gears on said fixed pinion supporting shaft in said differential case, a pair of oil baffles mounted on and secured to said pinion supporting shaft, the oil baffles being formed to a close running fit to the face and inner ends of the differential gear and pinion teeth at a point close to the engagement thereof, said differential case and baffles being formed about the differential gears and pinions so as to cause hydraulic resistance to rotation of the differential gears and pinions in either direction when oil is carried under the baffles by the differential gear and pinion teeth.

References Cited in the file of this patent
UNITED STATES PATENTS

| | | |
|---|---|---|
| 1,229,548 | Van Sant et al. | June 12, 1917 |
| 1,251,466 | Bilgram | Jan. 1, 1918 |
| 1,277,837 | Bilgram | Sept. 3, 1918 |
| 1,324,855 | Taylor | Dec. 16, 1919 |
| 1,324,857 | Taylor | Dec. 16, 1919 |
| 1,529,942 | Bradley | Mar. 17, 1925 |
| 2,267,362 | Ash | Dec. 23, 1941 |
| 2,272,416 | McVoy | Feb. 10, 1942 |
| 2,439,859 | Butterworth | Nov. 29, 1949 |